US006993343B2

(12) United States Patent
Yoshii et al.

(10) Patent No.: US 6,993,343 B2
(45) Date of Patent: Jan. 31, 2006

(54) BASE STATION DEVICE AND WIRELESS COMMUNICATION METHOD

(75) Inventors: Isamu Yoshii, Yokosuka (JP); Osamu Kato, Yokosuka (JP); Kenichi Miyoshi, Yokohama (JP); Atsushi Sumasu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 509 days.

(21) Appl. No.: 10/111,260

(22) PCT Filed: Aug. 27, 2001

(86) PCT No.: PCT/JP01/07301

§ 371 (c)(1),
(2), (4) Date: Apr. 23, 2002

(87) PCT Pub. No.: WO02/19751

PCT Pub. Date: Mar. 7, 2002

(65) Prior Publication Data

US 2002/0155840 A1    Oct. 24, 2002

(30) Foreign Application Priority Data

Aug. 29, 2000    (JP)    ............................. 2000-259457

(51) Int. Cl.
*H04Q 7/20* (2006.01)
*H04L 12/26* (2006.01)

(52) U.S. Cl. .............................. 455/452.1; 455/452.2; 455/509; 455/517; 455/453; 455/423; 370/230; 370/235; 370/321; 370/337; 370/347

(58) Field of Classification Search ............. 455/452.1, 455/452.2, 509, 517, 423, 424, 435.3; 370/230, 370/235, 321, 337, 347
See application file for complete search history.

(56) References Cited

U.S. PATENT DOCUMENTS 4,792,948 A  *  12/1988  Hangen et al. ............. 370/376
4,819,229 A  *  4/1989   Pritty et al. .................. 370/455

(Continued)

FOREIGN PATENT DOCUMENTS

JP    02274131    11/1990

(Continued)

OTHER PUBLICATIONS

International Search Report dated Nov. 27, 2001.

(Continued)

*Primary Examiner*—Lester G. Kincaid
*Assistant Examiner*—Huy Phan
(74) *Attorney, Agent, or Firm*—Stevens, Davis, Miller & Mosher, LLP (57) ABSTRACT

A DRC signal detecting section 113 demodulates a signal outputted from a despreading section 112 and detects a DRC signal; a transmitted-ratio calculating section 101 calculates the ratio of an amount of transmitted data to the total amount of data; an assigning section 102 decides the assignment of communication resources to each communication terminal based on the DRC signal which is detected by DRC signal detecting section 113 and the transmitted-ratio which is calculated by transmitted-ratio calculating section 101.

4 Claims, 4 Drawing Sheets

U.S. PATENT DOCUMENTS

| | | | |
|---|---|---|---|
| 5,515,375 A | 5/1996 | DeClerck | |
| 5,668,803 A * | 9/1997 | Tymes et al. | 370/312 |
| 5,914,946 A * | 6/1999 | Avidor et al. | 370/336 |
| 5,920,701 A * | 7/1999 | Miller et al. | 709/228 |
| 5,943,340 A * | 8/1999 | Iemura | 370/431 |
| 5,960,002 A * | 9/1999 | Ramfelt et al. | 370/450 |
| 6,072,784 A * | 6/2000 | Agrawal et al. | 370/311 |
| 6,108,316 A * | 8/2000 | Agrawal et al. | 370/311 |
| 6,366,763 B1 | 4/2002 | Ue et al. | |
| 6,490,271 B1 * | 12/2002 | Erjanne | 370/347 |
| 6,532,224 B1 * | 3/2003 | Dailey | 370/337 |
| 6,603,747 B2 * | 8/2003 | Asai | 370/322 |
| 6,813,261 B1 * | 11/2004 | Esmailzadeh et al. | 370/342 |
| 2001/0034475 A1 * | 10/2001 | Flach et al. | 600/300 |
| 2003/0063583 A1 * | 4/2003 | Padovani et al. | 370/329 |
| 2003/0193914 A1 * | 10/2003 | Lomp et al. | 370/335 |

FOREIGN PATENT DOCUMENTS

| | | |
|---|---|---|
| JP | 8502158 | 3/1996 |
| JP | 09219690 | 8/1997 |
| JP | 2000049663 | 2/2000 |
| JP | 2000152326 | 5/2000 |
| WO | 9931823 | 6/1999 |

OTHER PUBLICATIONS

"HDR Air Interface Physical Layer", QUALCOMM Incorporated, Feb. 18, 2000, pp. 1-35.

* cited by examiner

BASE STATION DEVICE AND WIRELESS COMMUNICATION METHOD

TECHNICAL FIELD

The present invention relates to a base station apparatus and a radio communication method used in a cellular communication system.

BACKGROUND ART

Cellular communication system is a communication system in which a base station carries out radio communications with a plurality of communication terminals simultaneously, accompanying with recent increasing demands that is requested to increase the transmission efficiency thereof.

HDR (High Data Rate) has been proposed as a technique to increase transmission efficiency of the downlink channel from base station to communication terminal. The HDR is a method of transmitting data thereby the base station carries out scheduling in which communication resources are time-divided and assigned to each communication terminal, further, the base station sets a transmission rate to each communication terminal according to downlink channel quality.

Now, a description will be made to the operation in which a base station and a communication terminal carry out HDR radio communication. First of all, the base station transmits a pilot signal to each communication terminal. Each communication terminal measures the downlink channel quality expressed by CIR (desired signal carrier to interference signal ratio), etc., based on the pilot signal and obtains a transmission rate that permits the communication therebetween. Then, each communication terminal selects a communication mode, which is a combination of a packet length, coding method, modulating method and spreading factor, based on the transmission rate that permits the communication therebetween, and transmits to the base station a data rate control (hereinafter, referred to as "DRC") signal which represents the communication mode.

The kinds of selectable modulating method in each system are predetermined such as BPSK, QPSK, 16QAM, 64QAM, etc. Also, the kinds of selectable coding in each system are predetermined such as ½ turbo coding, ⅓ turbo coding, ¾ turbo coding, etc. Furthermore, the kinds of selectable spreading factor in each system are predetermined such as 64 times spreading, 128 times spreading, 256 times spreading, etc. Still further, a plurality of selectable transmission rates are predetermined depending on the combination of a packet length, modulating method, coding method and spreading factor. From those combinations, each communication terminal selects a combination which permits the most efficient communication under the present downlink channel quality, and transmits a DRC signal which represents the selected communication mode to the base station. In general, the DRC signals are represented by numbers from 1 to N; the larger number represents the higher downlink channel quality.

The base station carries out the scheduling based on the DRC signal transmitted from each communication terminal, and notifies each communication terminal via a control channel with an information that indicates an assignment of communication resources for each communication terminal.

Generally, while taking into consideration an increase of the transmission efficiency of the system, the base station assigns the communication resources to a communication terminal having a higher downlink channel quality and giving priority thereto. Indeed, the base station assigns a larger number of time slots per one frame to a communication terminal having the higher downlink channel quality.

As described above, in a conventional HDR, the data transmission efficiency of an entire system is increased by assigning communication resources to each communication terminal based on the channel quality.

In the aforementioned conventional HDR, since the assignment of time slots is determined only based on the channel quality, the number of time slots to be assigned per one frame is reduced in a communication terminal having a poor channel quality. That is to say, in a communication terminal having a poor channel quality, the interval between the time slots assigned thereto becomes large.

In a communication terminal having a poor channel quality, since the interval between the assigned time slots is large, it takes a long time up to termination of the data communication in spite of the fact that almost all of data has been received. For example, it is conceivable that, at a point of time when a reception of all data for a tune of music has almost completed, it takes a long time up to the point of time when the data of the last slot is received, etc. Accordingly, in such a communication terminal, a waiting time becomes long resulting in an increase of power consumption in spite of the fact that the data communication has almost completed.

Moreover, at a time when almost all of data have been received, if the data communication with a communication terminal is terminated, it is possible to assign the time slots which have been assigned to the communication terminal to another communication terminal. Accordingly, from the viewpoint of the transmission efficiency in the entire system, it is inefficient that the interval of the time slots assigned to a communication terminal which is at the point of time when the data communication has almost completed is large.

DISCLOSURE OF INVENTION

An object of the present invention is to provide a base station apparatus and a radio communication method which are capable of decreasing the power consumption of a communication terminal as well as increasing the transmission efficiency in the entire system by promptly terminating data communication with a communication terminal which is at a point of time when the data transmission has almost completed in a communication system in which communication resources are assigned to each communication terminal on the basis of time division.

In order to achieve the forgoing object, in the present invention, it is to decide the assignment of the communication resources to each communication terminal while considering the ratio of the amount of transmitted data to total amount of data in addition to the downlink channel quality. Owing to this, it is possible to promptly terminate the data communication with a communication terminal which is at a point of time when the data communication has almost completed.

BEST MODE FOR CARRYING OUT THE INVENTION

Embodiments of the present invention will be specifically described below with reference to accompanying drawings.

(First Embodiment)

Figure 1:
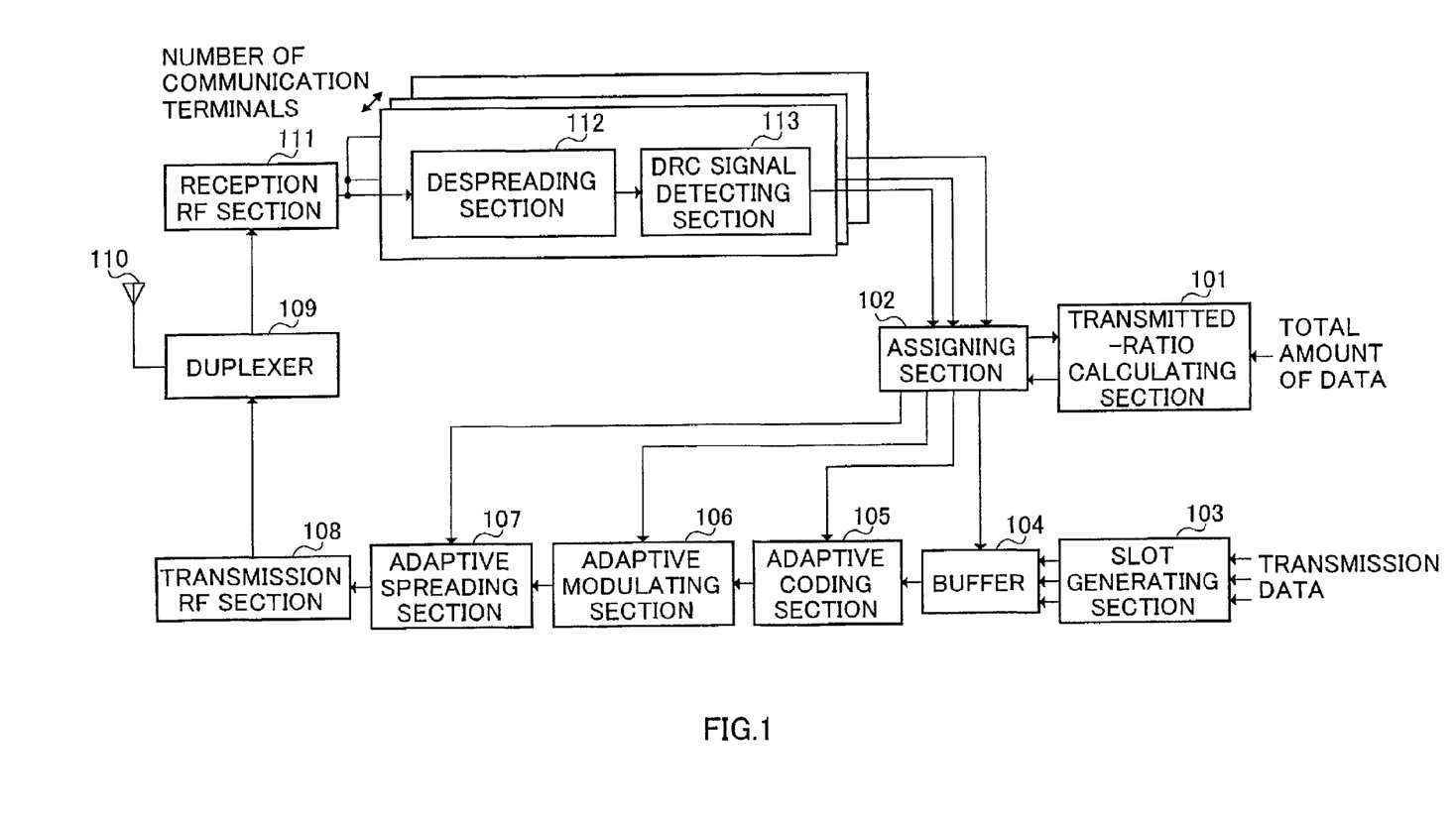
FIG. 1 is a block diagram showing a configuration of a base station according to the first embodiment of the present invention.

FIG. 1 is a block diagram showing a configuration of a base station according to the first embodiment of the present invention.

Referring to FIG. 1, a transmitted-ratio calculating section 101 calculates the ratio of the amount of transmitted data to total amount of data (hereinafter referred to as "transmitted-ratio") on each transmission data to be outputted to an assigning section 102.

The assigning section 102 decides an assignment of communication resources to each communication terminal based on a DRC signal detected by a DRC signal detecting section 113 and a transmitted-ratio calculated by transmitted-ratio calculating section 101. The DRC signal is a signal that represents a number corresponding to each communication mode (hereinafter, referred to as "DRC number"); where, the larger DRC number represents the higher downlink channel quality. That is to say, the assigning section 102 assigns time slots to each communication terminal while taking account of the transmitted-ratio and downlink channel quality.

Moreover, the assigning section 102 notifies a buffer 104 to output the transmission data based on the decided assignment of the time slots, notifies an adaptive coding section 105 of a coding rate of the transmission data based on the DRC signal, notifies an adaptive modulating section 106 of a modulating method of the transmission data and notifies an adaptive spreading section 107 of a spreading factor of the transmission data. Further, the assigning section 102 adds up the amount of transmitted data on each communication terminal to be outputted to the transmitted-ratio calculating section 101.

A slot generating section 103 divides the respective transmission data into units of each slot to be outputted to buffer 104. The buffer 104 holds the transmission data and outputs the transmission data of a notified communication terminal to adaptive coding section 105 in accordance with a notification from assigning section 102. The adaptive coding section 105 carries out coding on the transmission data outputted from buffer 104 in accordance with a notification from the assigning section 102 to be outputted to adaptive modulating section 106. The adaptive modulating section 106 modulates the transmission data outputted from adaptive coding section 104 in accordance with a notification from assigning section 102 to be outputted to adaptive spreading section 107. The adaptive spreading section 106 spreads the signal outputted from adaptive modulating section 106 in accordance with a notification from assigning section 102 to be outputted to a transmission RF section 108.

The transmission RF section 108 converts the frequency of the signal outputted from adaptive spreading section 107 into a radio frequency to be outputted to a duplexer 109. The duplexer 109 transmits the signal outputted from transmission RF section 108 to each communication terminal as a radio signal via an antenna 110. Also, the duplexer 109 outputs a signal which is transmitted from each communication terminal and received by the antenna 110 as a radio signal to a reception RF section 111.

The reception RF section 111 converts the frequency of the radio frequency signal outputted from duplexer 109 into a baseband signal to be outputted to despreading section 112. The despreading section 112 despreads the baseband signal via a spreading code which is used to spread the DRC signal to be outputted to DRC signal detecting section 113. The DRC signal detecting section 113 demodulates the signal outputted from despreading section 112 and detects the DRC signal to be outputted to assigning section 102.

The despreading section 112 and DRC signal detecting section 113 are provided to each communication terminal, and the DRC signal of each communication terminal is outputted from each DRC signal detecting section 113.

Next, a description will be made to an operation of the base station having the above-described configuration.

First of all, an information indicating the total amount of data of the transmission data which is to be transmitted to each communication terminal is obtained at transmission ratio calculating section 101. As for the method of obtaining the information indicating the total amount of data, for example, the following methods are available. That is to say, (1) a method in which the information indicating the total amount of data that is added to a header portion of the transmission data is obtained in an apparatus which is upper than the base station such as a control station; (2) a method in which a measuring section for measuring the total amount of data is provided in the base station and the measuring section outputs the information indicating the total amount of data to transmitted-ratio calculating section 101; and (3) a method in which a storing section for storing various transmission data is provided in the base station, and when the storing section outputs the transmission data in response to a request from a user of a communication terminal to the slot generating section 103, the storing section outputs the information which indicates the total amount of data to transmitted-ratio calculating section 101, etc.

Moreover, an information indicating an amount of transmitted data which is to be transmitted to each communication terminal is outputted from the assigning section 102 to transmitted-ratio calculating section 101. In assigning section 102, the amount of data to be transmitted per one slot can be recognized according to communication mode (i.e., coding rate, modulating method and spreading factor) which is specified by the DRC signal. Accordingly, in assigning section 102, the amount of transmitted data per one slot is added up on the basis of each communication terminal and the addition result is outputted to transmitted-ratio calculating section 101 as an information indicating the amount of transmitted data.

Figure 2:
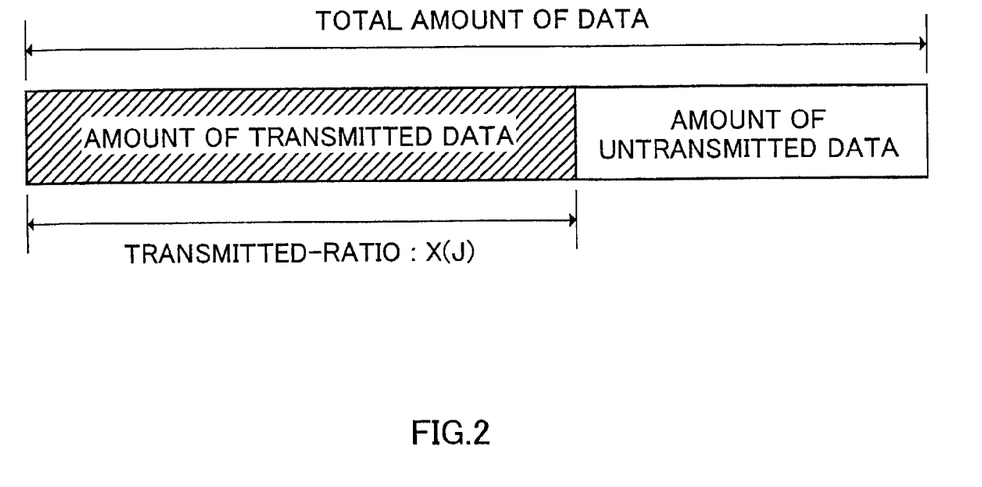
FIG. 2 is a diagram illustrating a transmitted-ratio which is calculated by a transmitted-ratio calculating section of the base station according to the first embodiment of the present invention.

In transmitted-ratio calculating section 101, a transmitted-ratio for each communication terminal is calculated based on the total amount of data and the amount of transmitted data. FIG. 2 is a diagram illustrating a transmitted-ratio which is calculated by a transmitted-ratio calculating section of the base station according to the first embodiment of the present invention. As shown in FIG. 2, a transmitted-ratio $X(j)$ is calculated as the ratio of the amount of transmitted data to total amount of data. Specifically, for instance, when the total amount of data is 500 Kbyte and the amount of transmitted data is 400 Kbyte, the transmitted-ratio $X(j)$ is calculated resulting in 0.8. The transmitted-ratio $X(j)$ represents a transmitted-ratio of the transmission data to a communication terminal j. A signal which represents the calculated transmitted-ratio X(j) is outputted to assigning section 102.

Next, in assigning section 102, an assignment of communication resources is decided based on the DRC signal and the transmitted-ratio X(j). Indeed, in assigning section 102, assignment of time slots to each communication terminal is decided while taking account of the transmitted-ratio and downlink channel quality, as described bellow.

That is to say, in assigning section 102, the priority B(j) for the communication terminal j is calculated using formula (1), given below, based on the DRC number R(j) represented by the DRC signal and the transmitted-ratio X(j).

$$B(j)=R(j)-(\alpha/X(j)) \quad (1)$$

In formula (1), the larger value of priority B(j) is the higher priority. Also, R(j) represents the DRC number indicated by DRC signal which is transmitted from the communication terminal j. Further, . represents a weighting factor; it is possible to adjust the level of the transmitted-ratio which is considered in addition to channel quality by adjusting the magnitude of the value.

From formula (1), given above, when the DRC number R(j) is fixed, the larger transmitted-ratio X(j) leads to larger value of the priority B(j). That is to say, the larger transmitted-ratio X(j) leads to higher priority of the communication terminal j. Accordingly, in the assigning section 102, the larger transmitted-ratio X(j) results in larger number of time slots that are assigned to the communication terminal j, and the interval between time slots which are assigned to communication terminal j becomes smaller. Therefore, in communication terminal j, more data is received by approaching to the completion of the reception of all data in one frame. In the present embodiment, although the priority is obtained from formula (1) while taking account of the transmitted-ratio and channel quality, it is not limited thereto; the priority may be obtained in any manner, only provided that the priority is obtained while taking account of the transmitted-ratio and channel quality.

As described above, according to the present embodiment, it is possible to promptly terminate the data communication to a communication terminal in which only a small amount of transmission data remains by making the interval between the time slots that are to be assigned thereto smaller since the assignment of the communication resources to each communication terminal is decided while considering the ratio of the amount of transmitted data to total amount of data in addition to downlink channel quality. Thereby, the power consumption of the communication terminal can be reduced.

Moreover, it is possible to increase the transmission efficiency in the entire system by promptly terminating the data communication to the communication terminal, since it is made possible to assign the time slots which have been assigned to the communication terminal to another communication terminal.

(Second Embodiment)

In the aforementioned first embodiment, since the priority is decided while taking account of the transmitted-ratio and downlink channel quality, there may be a case where a lot of time slots are assigned to a communication terminal having a poor downlink channel quality when the transmitted-ratio is large. In this case, the possibility of occurrence of data error becomes large in the communication terminal as long as the channel quality is poor. Also, when a data error occurs in a communication system in which an error control of ARQ (Automatic Repeat reQuest) system is carried out, the number of repeat times also becomes large when a lot of time slots are assigned to a communication terminal which has a high possibility of occurrence of data error, since the communication terminal resends a NACK (Negative ACKnowledgment) signal to a base station, and the base station repeats the corresponding data in which an error has occurred. Accordingly, in a communication system in which an error control of ARQ system is carried out, there may be a case where the transmission efficiency of the entire system is reduced adversely when the assignment of time slots is decided while taking account of the transmitted-ratio only and channel quality.

Therefore, in the present embodiment, the assignment of communication resources for each communication terminal is decided while taking account of both transmitted-ratio and the number of repeat times of the data in addition to downlink channel quality in a communication system in which an error control of ARQ system is carried out.

Figure 3:
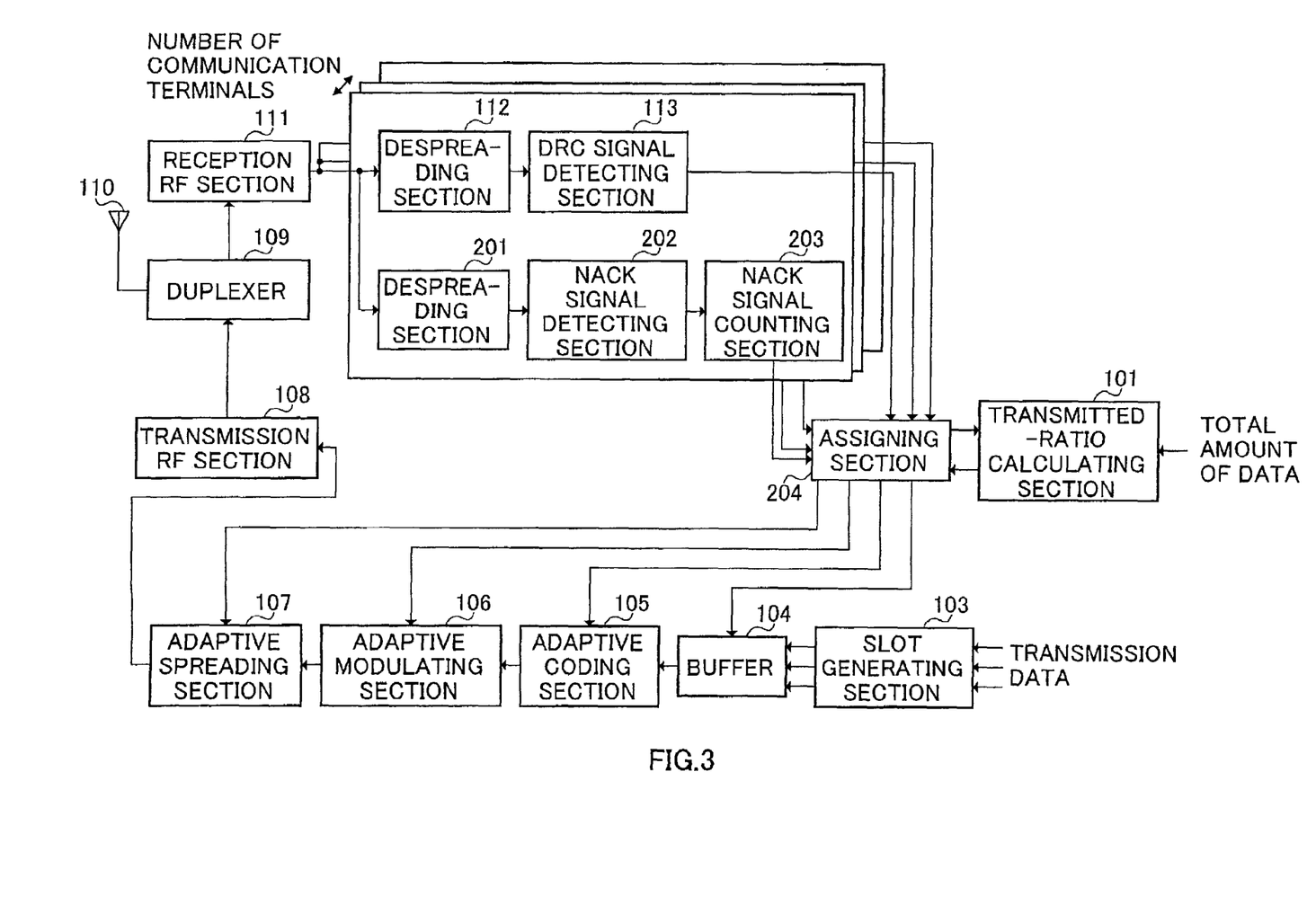
FIG. 3 is a block diagram showing a configuration of a base station according to the second embodiment of the present invention.

A description will be made below to a base station according to the present embodiment. FIG. 3 is a block diagram showing a configuration of the base station according to the second embodiment of the present invention. In FIG. 3, similar components to those of FIG. 1 are assigned with the same reference numerals as in FIG. 1, and the detailed description thereof will be omitted.

In FIG. 3, a despreading section 201 despreads a baseband signal via a spreading code which is used to spread ACK (ACKnowledgment) signal and NACK signal to be outputted to a NACK signal detecting section 202. The ACK signal is a signal which is returned from the communication terminal when no data error has occurred.

The NACK signal detecting section 202 demodulates the signal outputted from despreading section 201 and detects the NACK signal to be outputted to a NACK signal counting section 203. The NACK signal counting section 203 counts the number of NACK signals outputted from NACK signal detecting section 202. In other words, NACK signal counting section 203 counts the number of repeat times of the data.

The despreading section 112, DRC signal detecting section 113, despreading section 201, NACK signal detecting section 202 and NACK signal counting section 203 are provided for each communication terminal. The DRC signal of each communication terminal is outputted from each DRC signal detecting section 113, and the number of repeat times of the data is counted on the basis of each communication terminal by NACK signal counting section 203.

An assigning section 204 decides the assignment of communication resources for each communication terminal based on the DRC signal detected by DRC signal detecting section 113, the transmitted-ratio calculated by transmitted-ratio calculating section 101 and the number of repeat times counted by NACK signal counting section 203.

Next, a description will be made to the operation of the base station which has the configuration described above.

In assigning section 204, the assignment of communication resources is decided based on DRC signal, transmitted-ratio X(j) and number of repeat times N(j). That is, in assigning section 204, the assignment of time slots to each communication terminal is decided while taking account of both transmitted-ratio and number of repeat times in addition to downlink channel quality as described below.

That is to say, in assigning section 204, a priority B(j) for a communication terminal j is calculated using formula (2)

or (3), given below, based on a DRC number R(j) represented by the DRC signal, transmitted-ratio X(j) and number of repeat times N(j).

$$B(j)=R(j)-\{\alpha/(X(j)\beta/N(j))\} \quad (2)$$

$$B(j)=R(j)-(\alpha/X(j))-\beta N(j) \quad (3)$$

In formulas (2) and (3), N(j) represents the number of repeat times of the data to the communication terminal j. β represents a weighting factor; where it is possible to adjust the level of repeat times number which is considered in addition to channel quality by adjusting the value of β.

From formula (2) or (3), given above, when the DRC number R(j) is fixed, the larger number of repeat times N(j) due to a poor channel quality leads to smaller value of the priority B(j) even when the transmitted-ratio X(j) is large. That is to say, the larger number of repeat times N(j) leads to lower priority of the communication terminal j. Accordingly, in assigning section 204, the larger number of repeat times N(j) leads to smaller number of the time slots which are assigned to communication terminal j.

In the present embodiment, although the priority is obtained while taking account of both transmitted-ratio and the number of repeat times in addition to channel quality using the aforementioned formula (2) or (3), it is not limited thereto; the priority may be obtained in any method, only provided that the priority is obtained while taking account of both of transmitted-ratio and the number of repeat times in addition to channel quality.

As described above, according to the present embodiment, it is possible to reduce the number of slots which are to be assigned to a communication terminal with a large number of repeat times even when it has a large transmitted-ratio in a communication system in which error control of ARQ system is carried out, since the assignment of communication resources for each communication terminal is decided while taking account of both transmitted-ratio and the number of repeat times of the data in addition to downlink channel quality. Therefore, according to the present embodiment, it is possible to prevent the transmission efficiency of the entire system from being deteriorated adversely when the assignment of the time slots is decided while taking account of the transmitted-ratio and channel quality to increase the transmission efficiency of the entire system.

(Third Embodiment)

In the aforementioned first embodiment, among the communication terminals of the same total amount of receiving data (that is, the accumulated value of the forgoing total amount of data), the transmitted-ratio of the communication terminal which has the smaller amount of data per one transmission data (i.e., the forgoing total amount of data) becomes large earlier and the number of assignment of the time slots becomes larger than the others. In other words, in spite of the fact that the total amount of receiving data are the same, there may be a case where the waiting period of time of the communication terminal of which the amount of data per one transmission data is larger become longer resulting in a larger power consumption than the others. However, basically, it is preferable that the power consumption due to data communication is the same among the communication terminals having the same total amount of receiving data.

Therefore, according to the present embodiment, the assignment of communication resources for each communication terminal is decided while taking account of both of transmitted-ratio and communication continuation time in addition to downlink channel quality.

Figure 4:
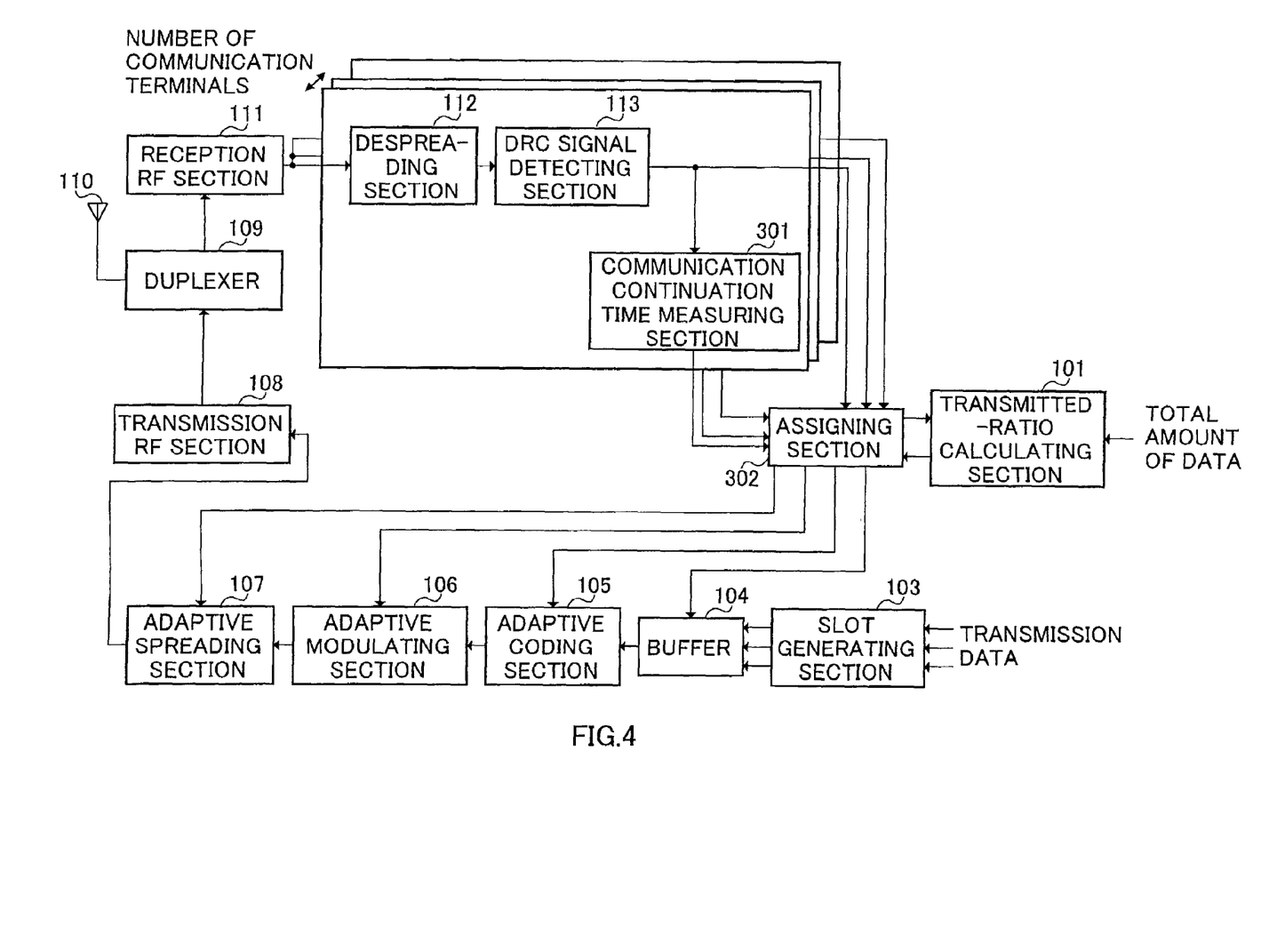
FIG. 4 is a block diagram showing a configuration of a base station according to the third embodiment of the present invention.

A description will be made below to a base station according to the present embodiment. FIG. 4 is a block diagram showing a configuration of the base station according to the third embodiment of the present invention. In FIG. 4, similar components to those in FIG. 1 are assigned with the same reference numerals as FIG. 1 and the detailed description thereof will be omitted.

In FIG. 4, a communication continuation time measuring section 301 measures a period of time when a call with a communication terminal is being established. That is to say, the communication continuation time measuring section 301 measures a period of time as long as the communication with a communication terminal is being continued. Also, the communication continuation time measuring section 301 measures a period of time as long as a DRC signal is being continuously outputted at a predetermined interval from DRC signal detecting section 113 as a communication continuation time. Indeed, the communication continuation time measuring section 301 measures a period of time when the communication terminal is transmitting a DRC signal to the base station as a communication continuation time.

The despreading section 112, DRC signal detecting section 113 and communication continuation time measuring section 301 are provided to each communication terminal. The DRC signal of each communication terminal is outputted from each DRC signal detecting section 113 and the communication continuation time is measured on the basis of each communication terminal by each communication continuation time measuring section 301.

The assigning section 302 decides the assignment of communication resources for each communication terminal based on the DRC signal detected by DRC signal detecting section 113, transmitted-ratio calculated by transmittedratio calculating section 101 and communication continuation time measured by communication continuation time measuring section 301.

Next, a description will be made to the operation of the base station which has the configuration described above.

In assigning section 302, the assignment of communication resources is decided based on the DRC signal, transmitted-ratio X(j) and communication continuation time L(j). In other words, in assigning section 302, the assignment of time slots to each communication terminal is decided while taking account of both transmitted-ratio and communication continuation time in addition to downlink channel quality, as described bellow.

That is to say, in assigning section 302, the priority B(j) for a communication terminal j is calculated using formula (4), given below, based on the DRC number R(j) represented by the DRC signal, transmitted-ratio X(j) and communication continuation time L(j).

$$B(j)=R(j)-(\alpha/X(j))+\gamma L(j) \quad (4)$$

In formula (4), the L(j) represents the communication continuation time with a communication terminal j. Also, γ represents a weighting factor where it is possible to adjust the level of the communication continuation time which is considered in addition to channel quality by adjusting the value γ.

From formula (4), given above, when the DRC number R(j) is fixed, the longer communication continuation time L(j) results in the larger value of the priority B(j) even when the transmitted-ratio X(j) is small. That is to say, the longer communication continuation time L(j) results in the higher priority of the communication terminal j. Accordingly, in assigning section 302, the longer communication continuation time L(j) results in a larger number of the time slots which are to be assigned to the communication terminal j.

In the present embodiment, although the priority is obtained using formula (4) while taking account of both transmitted-ratio and communication continuation time in addition to channel quality, it is not limited thereto; the priority may be obtained in any manner, only provided that the priority is obtained while taking account of both transmitted-ratio and communication continuation time in addition to channel quality.

As described above, according to the present embodiment, the number of slots which are to be assigned can be increased even for a communication terminal having small transmitted-ratio when its communication continuation time is long, since the assignment of communication resources to each communication terminal is decided while taking account of both transmitted-ratio and communication continuation time in addition to downlink channel quality. Therefore, according to the present embodiment, it is possible to make the power consumption due to data communication be substantially the same among communication terminals of which total amount of receiving data are identical, without depending on the amount of data per one transmission data.

The foregoing second embodiment and third embodiment can be carried out in combination with each other.

Further, in the foregoing first to third embodiments, a description has been made to a system in which a communication mode is decided at the communication terminal side and the DRC signal is transmitted therefrom and assignment of communication resources is carried out at the base station side. However, the present invention is not limited thereto but it is applicable to a system in which the communication mode decision and assignment of communication resources are carried out at the base station side. In this case, each communication terminal transmits an information which indicates a measured channel quality to the base station.

As described above, according to the present invention, data communication with a communication terminal which is at a point of time when the data transmission has almost completed can be terminated promptly in a communication system in which communication resources are assigned to each communication terminal in a time-division manner. Hence, according to the present invention, power consumption of communication terminal can be reduced and the transmission efficiency of the entire system can be increased.

This application is based on the Japanese Patent Application No. 2000-259457 filed on Aug. 29, 2000, entire content of which is expressly incorporated by reference herein.

What is claimed is:

1. A base station apparatus comprising:
   an assigner that performs scheduling of assignment of a plurality of time slots in a frame to a plurality of communication terminals; and
   a calculator that calculates a ratio of an amount of transmitted data to a total amount of data, for each of the plurality of communication terminals, wherein:
   the assigner gives a higher priority in the scheduling to a communication terminal having a greater ratio.

2. The base station apparatus of claim 1, further comprising:
   a counter that counts the number of retransmissions of data, for each of the plurality of communication terminals, wherein:
   the assigner further gives a lower priority in the scheduling to a communication terminal having a greater number of retransmissions.

3. The base station apparatus of claim 1, further comprising:
   a time measurer that measures a communication continuation time, for each of the plurality of communication terminals, wherein:
   the assigner gives a higher priority in the scheduling to a communication terminal having a greater communication continuation time.

4. A radio communication method, comprising:
   performing scheduling of assignment of a plurality of time slots in a frame to a plurality of communication terminals, and
   giving a communication terminal having a greater ratio of an amount of transmitted data to a total amount of data a higher priority in the scheduling.

* * * * *